May 29, 1951  A. BOSCHI  2,555,023
RESILIENT WHEEL FOR RAIL VEHICLES
Filed June 23, 1948
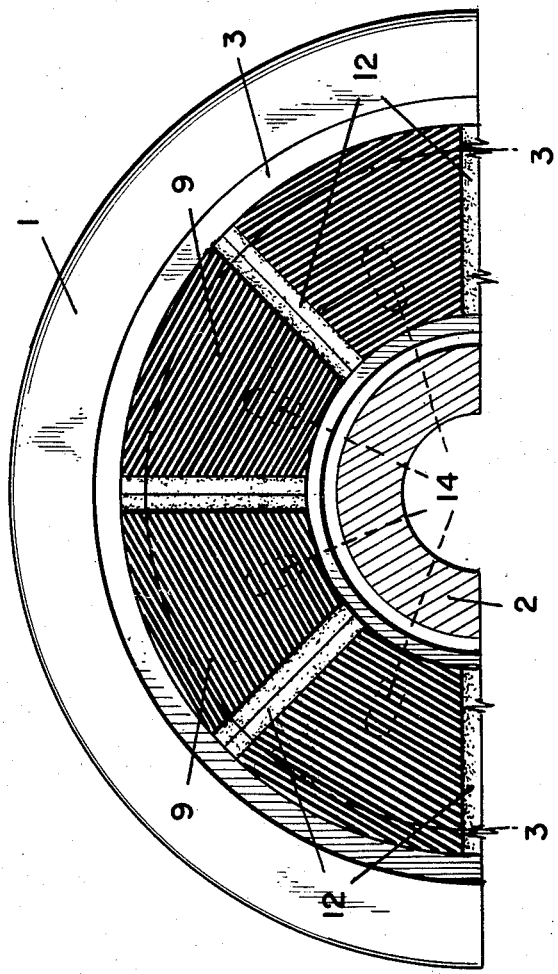
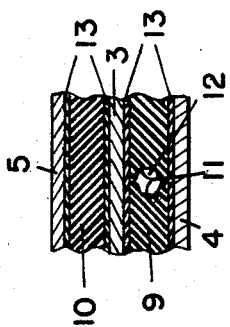
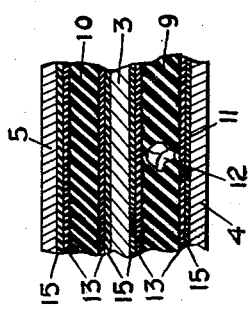
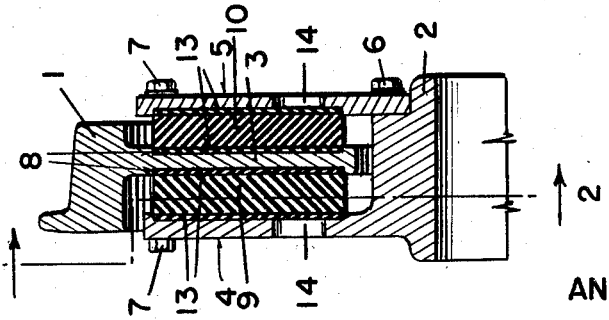
Inventor:
ANTONIO BOSCHI,
By Stone, Boyden + Mash
Attorneys.

Patented May 29, 1951

2,555,023

UNITED STATES PATENT OFFICE 2,555,023

RESILIENT WHEEL FOR RAIL VEHICLES

Antonio Boschi, Milan, Italy, assignor to Societa Applicazioni Gomma Antivibranti, Milan, Italy Application June 23, 1948, Serial No. 34,701
In Italy June 28, 1947

4 Claims. (Cl. 295—11)

This invention pertains to antivibration wheels for track vehicles, such as railroad and trainway cars. More particularly this invention has reference to elastic wheels of the type wherein a plurality of shear-flexion stressed rubber cushions are each interposed between two of a series of rigid metal flanges attached alternately to the rim and hub of the wheel.

In prior wheels of this type, the rubber cushions most commonly employed were in the form of unbroken rings which were attended by two serious disadvantages. First, the rubber cushions could not be removed from the wheel without completely disassembling the wheel, and second, the cushions being in the shape of a solid annulus were not as deformable under working loads as was required for desired results. Furthermore, the manufacture of the metal and rubber parts in the form of a solid annulus required large dimensioned machines and long and expensive operations.

In order to overcome these difficulties, I proposed, in my U. S. application, Serial No. 9,604, filed February 19, 1948, the use of elastic parts shaped as separate, complementary annular sectors which were contained in similarly shaped recesses in the contacting metal flanges. While this construction had the anticipated advantages over the prior solid annular cushion arrangement, it too is attended with several disadvantages, both in respect to complication and expense of manufacture of the metal parts, and also as to the use of several tenoning and securing means required to hold the elastic cushions to the metal parts.

An object of this invention is to avoid all of the above disadvantages by providing an improved arrangement wherein the design and construction of the elastic and metal parts is greatly simplified and the cost of production correspondingly reduced.

Another object of this invention is to provide an elastic wheel wherein the rubber elements can be readily removed and replaced without completely disassembling the wheel.

Still another object of this invention is to provide an elastic wheel wherein the number of metal parts and securing means is greatly reduced over those employed in the prior art, as exemplified in my U. S. application, Serial No. 8,928, filed February 17, 1948.

With these and other objects in view which may be incident to my improvements, my invention consists in the combination and arrangement of elements hereinafter described and illustrated in the accompanying drawing in which:

Figure 1 is a radial cross-section of my improved wheel;

Figure 2 is a diametral section along the line 2—2 of Figure 1;

Figure 3 is a lineally developed, fragmentary section of a portion of the wheel, along the circular section line 3—3 of Figure 2; and Figure 4 is a view similar to Figure 3, showing a modified construction wherein thermo-insulating plates are employed.

Referring to Figures 1 and 2, the reference numerals 1 and 2 denote respectively the rim and hub of the wheel. The rim 1 has on its inner side an integral, inwardly-extending, annular flange 3, while the hub 2 has on its inner (left) face an integral, outwardly-extending flange 4, and on its outer (right) face a similar flange 5, detachably mounted and held in place by bolts 6. Flanges 4 and 5 are also held in desired spaced relation to each other by a plurality of circumferentially spaced bolts 7. On the inner faces of the flanges 4 and 5 and on both faces of the flange 3 are identical annular recesses 8 which serve to receive and hold in radial spaced relation an inner series 9, and an outer series 10, of rubber cushions, each of which is formed in the shape of an annular sector, as clearly shown in Figure 2.

Each rubber cushion 9 and 10 has in each of its radial faces a groove 11, the outer edge of which abut those of the groove in the adjacent cushion so as to form a series of radial channels 12 for the circulation of cooling air which is increased by centrifugal force when the wheel is in motion.

Each rubber cushion 9 and 10 has bonded to each lateral face, by vulcanization or other suitable means, a metal reinforcing plate 13 of the same size and shape as the lateral faces of the rubber cushions. These metal plates 13 are made with a sufficient degree of accuracy to insure that, when they are assembled in recesses 8, their adjacent radial edges so closely abut one another as to form a virtually continuous metal web across the joints between adjacent rubber cushions, thereby insuring that the stresses in the plates 13 are effectively transferred from one plate to the abutting plates during the working of the wheel. Furthermore, the accuracy of manufacture of the plates 13 and the recesses 8 is such as to insure that the plates will be self-retaining in the recesses 8 without requiring any additional locating or securing means to keep them in position.

When in assembled position, as shown in Figure 2, each series of cushions 9 and 10 form a substantially continuous, annular elastic web member which is interposed between the outer faces of the rigid flange 3 and the inner faces of the rigid flanges 4 and 5, respectively. When the rubber cushions 9 and 10 are assembled in the recesses 8, as shown in Figures 1 and 2, the detachable flange 5 is secured in place by the bolts 6 and 7 which, when tightened, apply a transverse compression to the rubber cushions 9 and 10 in an axial direction. Since each rubber cushion 9 and 10 abuts its adjacent cushions and all are held in fixed position radially by the recesses 8, and circumferentially by abutting each other, no tenoning or other securing means are required to hold the rubber cushions in assembled position.

By providing the grooves 11 in the radial edges of each rubber cushion, the reduced area of the abutting edges of each adjacent pair of the cushions 9 and 10 permits easier deformability of the rubber cushions in axial compression when the bolts 6 and 7 are tightened, thereby reducing the stresses incident to obtaining the necessary axial compression required to avoid tension stresses in the rubber cushions when they are deformed under working load. In this way a far greater amount of compression may be obtained without increasing the weight of the mechanical parts. The channels 12 resulting from grooves 11, also afford a space for the rubber cushions to deform circumferentially under working load thereby increasing the resiliency of the rubber cushions and their capacity to absorb shocks and vibration by shear-flexion stress. By varying the shape of the grooves 11 the radial and tangential rigidity of the wheel may be regulated within prescribed limits according to the working requirements of the wheel.

When the rubber cushions have to be replaced it is not necessary to disassemble the whole wheel in order to remove them, but only to remove the outer flange 5, and axially displace the rim 1 and flange 3 without disassembly; then the several rubber cushions can be readily removed by radial withdrawal. New rubber cushions can likewise be installed by reversing this procedure.

Another advantage of my improved wheel is that the rubber cushions, being relatively small in size, simple in design and identical in shape may be quickly and cheaply manufactured independently of the wheel and are interchangeable.

When it is desired to further protect the rubber cushions against the deleterious effect of heat, they may be thermally insulated from adjacent metal parts of the wheel by inserting between each plate 13 and its adjacent metal flange, a similarly-shaped plate 15 of thermo-insulating material, as shown in Figure 4. Also ventilating holes 14 may be provided in flanges 4 and 5, as indicated in Figures 1 and 2, and the elastic elements may form an even number $n$ of annular cushions greater than 2 secured to an odd number $n+1$ of rigid flanges greater than 3.

Furthermore, when it is desired, the relative arrangement of the flanges 3, 4 and 5 may be inverted, that is to say, the central flange 3 may be made integral with the hub 2 and outwardly extending, while the flanges 4 and 5 are connected to the rim 1 and extend inwardly. In this case, either flange 4 may be made integral with the rim 1 and flange 5 detachably bolted to the rim, or vice versa.

While I have shown and described the preferred embodiment of my invention, it is to be understood that I do not limit myself to the details of construction disclosed by way of illustration, as these may be changed and modified by those skilled in the art without departing from the spirit of my invention or exceeding the scope of the appended claims.

I claim:

1. An elastic wheel comprising a rigid arm, a rigid hub, a plurality of radially extending flanges alternately secured to said hub and rim, and a plurality of elastic web members, each interposed between a rim flange and a hub flange, and connecting said rim and hub; each of said elastic web members comprising a series of metal-reinforced, rubber annular sectors which abut each other and form a substantially continuous annular web member adapted to transmit thrust from said hub to said rim by shear-flexion stress, each of said flanges being provided with one or more annular recesses which serve to hold said rubber sectors and their metal reinforcements in fixed radial position in said wheel.

2. An elastic wheel comprising a rigid rim, a rigid hub, a plurality of radially extending flanges alternately secured to said hub and rim, and a plurality of elastic web members, each interposed between a rim flange and a hub flange, and connecting said rim and hub; each of said elastic web members comprising a series of metal-reinforced, rubber annular sectors which abut each other and form a substantially continuous annular web member adapted to transmit thrust from said hub to said rim by shear-flexion stress, each rubber sector having a groove in each radial face whereby the deformability of each sector in transverse compression is increased.

3. An elastic wheel comprising a rigid rim, a rigid hub, a plurality of radially extending flanges alternately secured to said hub and rim, and a plurality of elastic web members, each interposed between a rim flange and a hub flange, and connecting said rim and hub; each of said elastic web members comprising a series of metal-reinforced, rubber annular sectors which abut each other and form a substantially continuous annular web member adapted to transmit thrust from said hub to said rim by shear-flexion stress, said wheel having a radial channel between each pair of abutting rubber sectors for the circulation of cooling air.

4. An elastic wheel comprising a rigid rim, a rigid hub, a plurality of radially extending flanges alternately secured to said hub and rim, and a plurality of elastic web members, each interposed between a rim flange and a hub flange, and connecting said rim and hub; each of said elastic web members comprising a series of metal-reinforced, rubber annular sectors which abut each other and form a substantially continuous annular web member adapted to transmit thrust from said hub to said rim by shear-flexion stress, said wheel having a radial channel between each pair of abutting rubber sectors adapted to increase the circumferential and radial deformability of said rubber sectors under working load.

ANTONIO BOSCHI.

REFERENCES CITED

The following references are of record in the file of this patent:

UNITED STATES PATENTS

| Number | Name | Date |
|---|---|---|
| 2,090,179 | Brownyer | Aug. 17, 1937 |
| 2,244,633 | Sauer | June 3, 1941 |
| 2,270,622 | Burton | Jan. 20, 1942 |
| 2,294,818 | Williams | Sept. 1, 1942 |

FOREIGN PATENTS

| Number | Country | Date |
|---|---|---|
| 58,156 | Norway | July 12, 1937 |